(12) United States Patent
Tseng et al.

(10) Patent No.: US 8,099,625 B1
(45) Date of Patent: Jan. 17, 2012

(54) SELF-CHECKING AND SELF-CORRECTING INTERNAL CONFIGURATION PORT CIRCUITRY

(75) Inventors: Chen Wei Tseng, Longmont, CO (US); Weiguang Lu, San Jose, CA (US); Matthew P. Baker, San Francisco, CA (US)

(73) Assignee: XILINX, Inc., San Jose, CA (US)

( * ) Notice: Subject to any disclaimer, the term of this patent is extended or adjusted under 35 U.S.C. 154(b) by 300 days.

(21) Appl. No.: 12/418,522

(22) Filed: Apr. 3, 2009

(51) Int. Cl.
*G06F 11/00* (2006.01)
*G06F 11/16* (2006.01)

(52) U.S. Cl. .......... 714/15; 714/10; 714/13; 714/28; 714/725; 703/21

(58) Field of Classification Search .......... 714/10, 714/13, 15, 21, 28, 725, 16, 17; 703/15, 703/16, 17, 21
See application file for complete search history.

(56) References Cited

U.S. PATENT DOCUMENTS

| | | | | |
|---|---|---|---|---|
| 5,185,693 A | * | 2/1993 | Loftis et al. | 700/82 |
| 5,655,069 A | * | 8/1997 | Ogawara et al. | 714/10 |
| 6,393,582 B1 | * | 5/2002 | Klecka et al. | 714/11 |
| 6,636,936 B2 | * | 10/2003 | Terrill et al. | 711/103 |
| 7,366,948 B2 | * | 4/2008 | Michaelis et al. | 714/12 |

\* cited by examiner

*Primary Examiner* — Joseph Schell
(74) *Attorney, Agent, or Firm* — W. Eric Webostad; Thomas George (57) ABSTRACT

Method and apparatus for self-checking and self-correcting memory states of a programmable resource is described. Programmable resource of an integrated circuit has a first core and a second core instantiated therein. A first internal configuration port and a second internal configuration port of the integrated circuit are respectively connected to the first core and the second core. The second core is coupled to the first core for monitoring operation of the first core with the second core, and the second core is configured to obtain control responsive to a failure of the first core or the first internal configuration port for a self-correcting mode.

20 Claims, 5 Drawing Sheets

SELF-CHECKING AND SELF-CORRECTING INTERNAL CONFIGURATION PORT CIRCUITRY

FIELD OF THE INVENTION

The invention relates to integrated circuit devices ("ICs"). More particularly, the invention relates to a self-checking and self-correcting internal configuration port circuitry for an IC.

BACKGROUND OF THE INVENTION

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device ("CPLD"). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Conventionally, three configuration access ports were used for redundancy. With respect to three configuration access ports for programming configuration memory coupled to field programmable logic gates, only one of such ports was active at a time. As only one of such ports is capable of being active at a time in order avoid data corruption or conflicts, voting circuitry was implemented to select which port to use. However, implementation of voting circuitry, as well as having three or more configuration access ports, required a significant amount of overhead.

It should be appreciated that using redundant configuration access ports provides increased reliability to mitigate against single event upset ("SEU") or multiple bit upset or multi-bit upset ("MBU") events. As is known, SEU or MBU is generally due to radiation from space, such as heavy ion particles or other radiation, causing state of circuitry, such as memory cells, to flip. Below atmosphere, upsets caused by neutron or alpha particles could result in SEU or MBU as well although at a much lower rate. Accordingly, redundant modules are often employed, especially for high reliability applications as they may not tolerate application down time. However, as devices become smaller with smaller lithographies, the likelihood of SEU or MBU events may increase, and thus redundant modules may become more prevalent in space as well as terrestrial applications.

As previously indicated, conventionally, a triple module redundancy with voting circuitry was used. Such triple module redundancy was to mitigate against SEU or MBU events, and generally involved partial reconfiguration through a configuration interface. By partial reconfiguration, it is generally meant that only a portion of a configuration, such as may be associated with a configuration bit stream, is reloaded or reprogrammed for a repair. Furthermore, such partial reconfiguration may be active or dynamic, meaning that operation of an FPGA is not ceased, and in some embodiments operation of a user instantiated design is not ceased, for such partial reconfiguration. Such conventional SEU or MBU mitigation may employ an external configuration interface such as a Select Map or JTAG interface or an internal configuration interface, such as an internal configuration access port ("ICAP"); all of these interfaces are available on FPGAs from Xilinx, Inc., of San Jose, Calif. However, such conventional mitigation for detecting and correcting errors involved using a microprocessor or micro-sequencer core, such as a PicoBlaze™ core available from Xilinx, Inc., instantiated in field programmable logic gates of an FPGA for purposes of voting, as previously described. This involved significant overhead.

As is known, Virtex® FPGAs available from Xilinx have built in detection and correction logic for detecting SEUs and MBUs. For MBUs, correction conventionally involves reloading a portion of a configuration bit stream, namely partial reconfiguration, to correct multiple bits. An SEU, namely in which only one bit is in error, may be corrected with such built in detection and correction logic by resetting the individual bit, and this type of single bit fix is generally not considered partial reconfiguration.

A limitation of solutions heretofore was having a single point of failure. For example, both external and internal configuration access ports provide access to configuration logic; however, if memory cells in an I/O interface or routing of such interfaces are upset by an SEU or MBU, the ability to access configuration logic, and in particular configuration memory associated with such configuration logic, was precluded. In other words, there was a single point of failure for a selected interface. Even though Virtex® FPGAs available from Xilinx each provide two ICAPs, configuration commands are first sent through an active ICAP in order for an alternative ICAP to subsequently obtain control for writing and reading to configuration memory of configuration logic. Thus if an ICAP currently having control, namely the primary or default ICAP is upset, the back-up ICAP was rendered useless. Accordingly, the mitigation of such upsets was prohibited to such a single point of failure.

SUMMARY OF THE INVENTION

One or more aspects generally relate to self-checking and self-correcting internal configuration port circuitry for an IC.

An aspect relates generally to a method for self-correcting. The method includes configuring a programmable resource of an integrated circuit where the act of configuring includes instantiating a first core and a second core, and forming interconnects, including connections for a first internal configuration port and a second internal configuration port of the integrated circuit. The first core is activated for operation of the first internal configuration port as a default internal configuration port. The first core is monitored by the second core, and responsive to a failure of the first core or the first internal configuration port, control is transferred over to the second core for operation of the second internal configuration port for a self-correcting mode.

Further, the method can include determining whether the failure is a single bit soft error failure; fixing the single bit soft error failure using the second internal configuration port to set a configuration bit of a configuration memory cell associated with the single bit error failure; and switching control back to the first core for operation of the first internal configuration port as the default internal configuration port. In addition, the method can include determining whether the failure is a multiple bit soft error failure; fixing the multiple bit soft error failure using the second internal configuration port for partial reconfiguration of configuration memory associated with the multiple bit error failure; and switching control back to the first core for operation of the first internal configuration port as the default internal configuration port. Moreover, the method can include determining whether the failure is a hard bit error failure; fixing the hard bit error failure by repeating the configuring; and repeating the activating and the monitoring.

The act of responsive to the failure can further include determining whether the failure of the second core of the second internal configuration port is a single bit soft error failure; and fixing the single bit soft error failure using the first internal configuration port to set a configuration bit of a configuration memory cell associated with the single bit error failure. In addition, the act of responsive to the failure can include determining whether the failure of the second core of the second internal configuration port is a multiple bit soft error failure; and fixing the multiple bit soft error failure using the first internal configuration port for partial reconfiguration of configuration memory associated with the multiple bit error failure.

The act of switching control can include asserting a control word for the second internal configuration port for activation thereof. The act of monitoring includes checking by the second core for periodic toggling of a state bit indicating operation of the first core. The method further includes validating operation of the first internal configuration port by the first core, where the validating includes: writing with the first internal configuration port a dummy value to a frame address register; reading with the first internal configuration port the dummy value written from the frame address register; and verifying whether the dummy value written and the dummy value read are equivalent.

The method can further include responsive to the failure being of the first internal configuration port as determined by the verifying indicating that the dummy value written and the dummy value read are not equivalent, turning over control from the first core to the second core for the switching. In addition, the method can further include responsive to the verifying, indicating that the dummy value written and the dummy value read are equivalent; reading back via the first internal configuration port of a configuration memory for obtaining a first checksum value; and comparing the first checksum value with a second checksum value, where the second checksum value is a predetermined expected result for the obtaining of the first checksum value.

Moreover, the method can include responsive to the first checksum value and the second checksum value not being equivalent, indicating an error condition; determining whether the error condition is for a single bit soft error condition; and fixing the single bit soft error condition using the first internal configuration port to set a configuration bit of a configuration memory cell associated with the single bit error condition. In addition, the method can include responsive to the first checksum value and the second checksum value not being equivalent, indicating an error condition; determining whether the error condition is for a multiple bit soft error condition; and fixing the multiple bit soft error condition using the first internal configuration port for partial reconfiguration of configuration memory associated with the multiple bit error condition.

Another aspect relates generally to an apparatus for self-correcting. A programmable resource of an integrated circuit has a first core and a second core instantiated therein. A first internal configuration port and a second internal configuration port of the integrated circuit are respectively connected to the first core and the second core. The second core is coupled to the first core for monitoring operation of the first core with the second core, and the second core is configured to obtain control responsive to a failure of the first core or the first internal configuration port for a self-correcting mode.

The second core can be configured to determine whether the failure is a single bit soft error failure or a multiple bit soft error; the second core can be configured to initiate fixing the single bit soft error failure using the second internal configuration port to set a configuration bit of a configuration memory cell associated with the single bit error failure; and the second core can be configured to initiate fixing the multiple bit soft error failure using the second internal configuration port for partial reconfiguration of configuration memory associated with the multiple bit error failure, where control is switched back to the first core for operation of the first internal configuration port as the default internal configuration port.

The second core can be configured to assert a control word for the second internal configuration port for activation thereof. The first core can be configured to periodically toggle a state bit to indicate an operative state of the first core; and the second core can be configured to monitor toggling of the state bit to determine if operation of the first core seizes.

The first core can be configured to cause a write by the first internal configuration port of a stored dummy value to a frame address register of the first internal configuration port, to cause a read by the first internal configuration port of the frame address register, and to compare the dummy value written and the dummy value read for equivalence.

In addition, the first core can be configured to cause a readback via the first internal configuration port of a configuration memory and also can be configured for obtaining a first checksum value from the readback. The first core can be configured to compare the first checksum value with a second checksum value for equivalence. The second checksum value can be a predetermined expected result for the obtaining of the first checksum value. The first core can be configured to initiate a repair responsive to the first checksum value and the second checksum value not being equivalent. The first core can be configured to determine whether an error condition is for a single bit soft error condition or a multiple bit soft error condition. The first core can be configured to initiate fixing the single bit soft error condition using the first internal configuration port to set a configuration bit of a configuration memory cell of the configuration memory associated with the single bit soft error condition. The first core can be configured to initiate fixing the multiple bit soft error condition using the first internal configuration port for partial reconfiguration of a portion of the configuration memory associated with the multiple bit soft error condition.

Yet another aspect relates generally to an apparatus for self-correcting. A programmable resource has instantiated thereof a first core and a second core and has a first internal configuration port and a second internal configuration port. The first core is configured to: operate the first internal configuration port as a default internal configuration port, monitor operation of the first internal configuration port, and readback, via the first internal configuration port of a configuration memory associated with the programmable resources to check for one or more first event upsets. The second core is configured to monitor operation of the second internal configuration port and to monitor operation of the first core. Responsive to a failure of the first core or the first internal configuration port due to one or more second event upsets, the second core configured to: take over from the first core for repairing the first core or the first internal configuration port, and initiate partial reconfiguration via the second internal configuration port for repair of a multiple bit soft error of the first core or the first internal configuration port.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
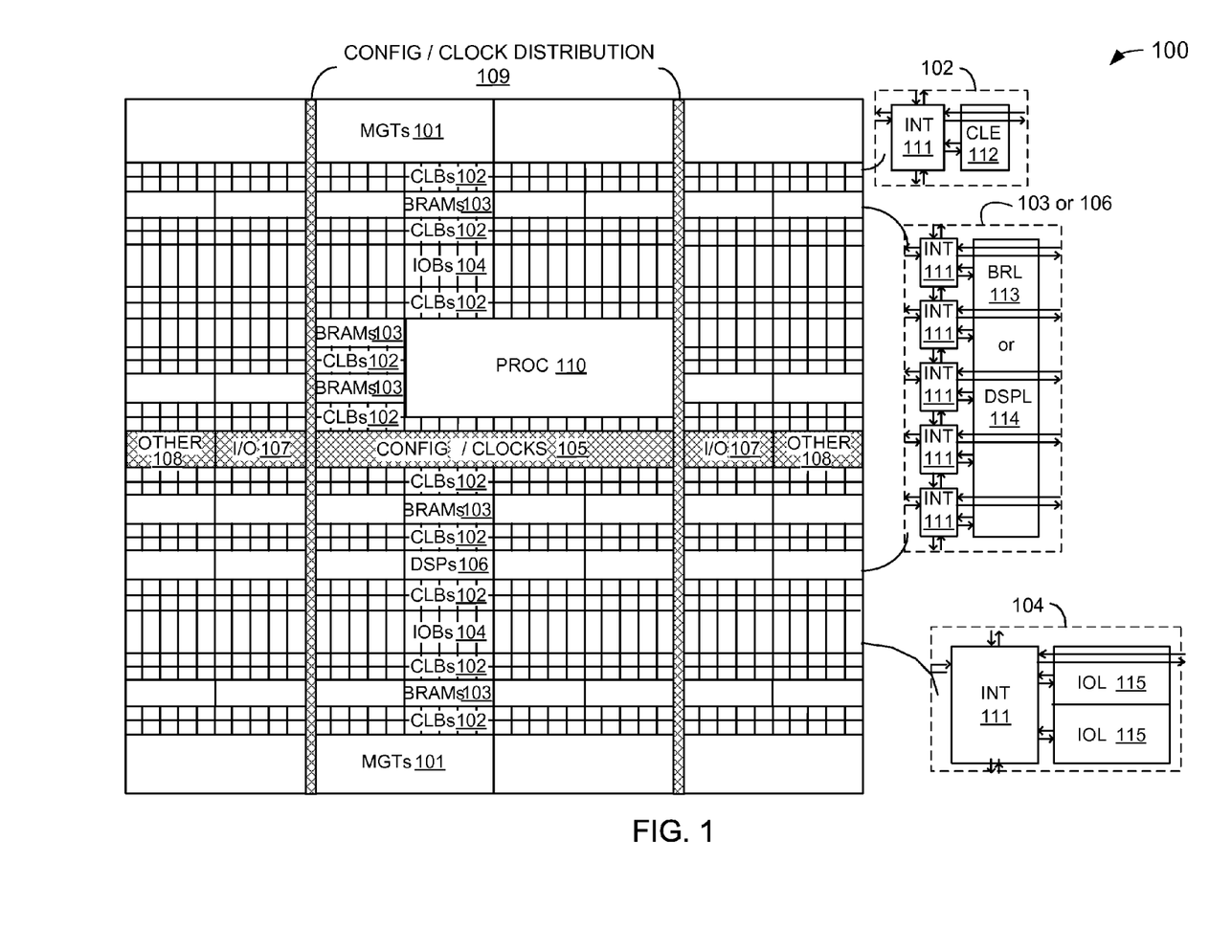
FIG. 1 is a simplified block diagram depicting an exemplary embodiment of a columnar Field Programmable Gate Array ("FPGA") architecture in which one or more aspects of the invention may be implemented.

As noted above, advanced FPGAs can include several different types of programmable logic blocks in the array. For example, FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1.

For example, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the pictured embodiment, a columnar area near the center of the die (shown in FIG. 1) is used for configuration, clock, and other control logic. Horizontal areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, processor block 110 spans several columns of CLBs and BRAMs.

Note that FIG. 1 is intended to illustrate only an exemplary FPGA architecture. For example, the numbers of logic blocks in a column, the relative width of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

Figure 2:
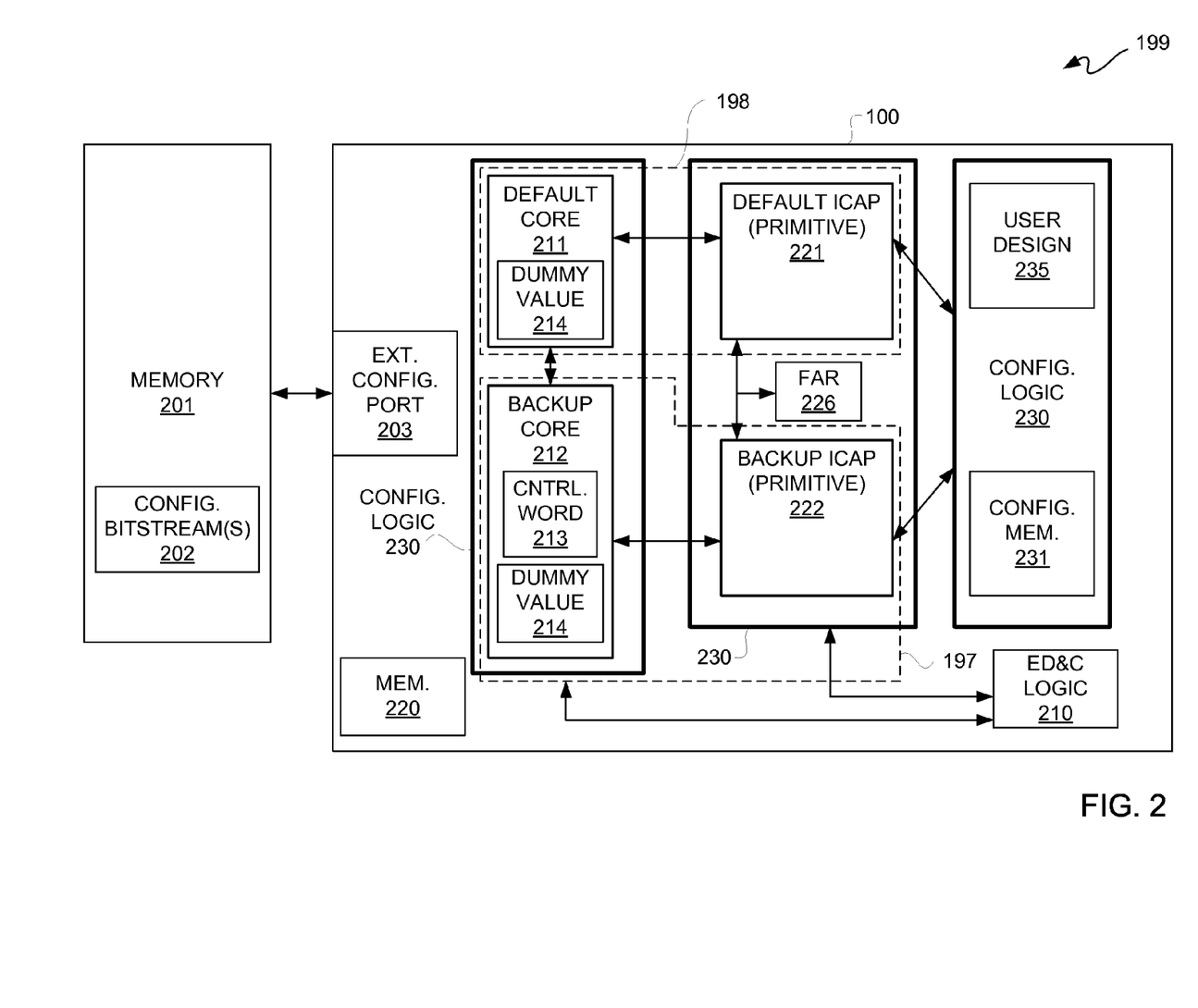
FIG. 2 is a block diagram depicting an exemplary embodiment of a dual module redundancy system for mitigating against an SEU or MBU.

FIG. 2 is a block diagram depicting an exemplary embodiment of a dual module redundancy system 199 for mitigating against SEU or MBU events. System 199 allows a backup ICAP to overtake access to configuration logic even when operational status a default or active ICAP is upset. Thus, the above described limitation associated with rendering a backup ICAP useless if a default or primary ICAP was upset is overcome. Additionally, instead of having to have three modules or cores in a user design and voting on which one is active, duplicate cores maybe used and still not be subject to a single point failure mode. Thus, circuitry overhead is reduced by system 199.

System 199 includes an integrated circuit such as, e.g., FPGA 100 which is coupled to external memory 201. External memory 201 may be a form of nonvolatile memory as is known. Memory 201 may be used for storing one or more configuration bitstreams 202 for configuring configurable logic 230 of FPGA 100. An external configuration port 203 of FPGA 100 may be coupled to memory 201 for providing one or more configuration bitstreams 202 to FPGA 100 for programming configuration memory 231 of configuration logic 230. Even though a single external configuration port 203 is illustratively depicted, there may be more than one external configuration port. For example, Virtex® FPGAs from Xilinx conventionally have a Select Map port and a JTAG port as external ports available for configuring configuration memory 231.

Programmable resources such as, e.g., configuration logic 230 has field programmable logic gates which are programmed by active outputs of configuration memory 231, as is known. A portion of configuration logic 230 is used for instantiating default core 211 and backup core 212 responsive to a configuration bitstream, such as of configuration bitstreams 202. Nonvolatile memory 201 may be hardened, such that it is highly unlikely to experience an SEU or MBU.

Such external configuration port 203 may be used for writing to configuration memory 231 to instantiate default core 211 and backup core 212. Additionally, as is known, configuration memory 231 is used for routing to make connections from dedicated ICAP logic. Such dedicated logic without pre-routing is conventionally referred to as a "primitive" as in its present state it is adaptable for various interconnects. In this embodiment, FPGA 100 has two primitives, namely default ICAP 221 and backup ICAP 222, which are routed via programmable interconnect points ("PIPs") of configurable logic 230 as controlled by programming configuration memory 231. Associated with configuration logic 230 may be a frame address register ("FAR") 226. FAR 226 may be used for checking connection of ICAPs 221 and 222 to configuration memory of configuration logic 230. Accordingly, default ICAP 221 and backup ICAP 222 may both be coupled to FAR 226. Registers, such as status and control registers among other registers, are included as dedicated circuits of configuration logic. Accordingly, alternatively registers other than FAR 226 may be used for checking operational status of connections of an ICAP to configuration memory. Furthermore, optionally, internal memory 220 of FPGA 100 may be used to locally store partial configuration bitstreams for default core 211 and backup core 212, as well as for routing of interconnects for ICAPs 221 and 222 for reconfiguration of backup module 197 or default module 198.

Default core 211 and backup core 212 are coupled to circuitry instantiated in configuration logic 230 more directly than through ICAPs 221 and 222 for receiving signaling for a user instantiated design 235, as may vary from application to application. Thus, a user instantiated design 235 in configuration logic 230 may provide control signals to default core 211 and backup core 212, for purposes of redundancy, for causing an active one of those cores to access its respective ICAP 221 or 222, such as for dynamic partial reconfiguration. Dynamic partial reconfiguration, means, e.g., that a user design may have portions which are reconfigurable while the remainder of the design continues to operate. Furthermore, dynamic partial reconfiguration means, e.g., that the entire FPGA need not be shut down and then reconfigured. Furthermore, in some instances partial reconfiguration is just to instantiate a different module for a user design, and thus does not necessarily involve reconfiguring an existing module or taking an existing module out of operation.

As previously described, in this embodiment, only one ICAP may be active at a time to avoid conflicts or corruption of configuration information. In this example, default core 211 instantiated in a portion of configuration logic 230 is for a primary or active ICAP 221. Default core 211 after configuration of FPGA 100 is interconnected for communication with default ICAP 221 to cause default ICAP 221 to read from or write to configuration memory 231 of configuration logic 230. Furthermore, after configuration of FPGA 100, backup core 212 is interconnected with backup ICAP 222 for causing backup ICAP 222, subject to assertion of control word 213, to read from and write to configuration memory 231 of configuration logic 230. A dummy value 214 may be stored for access by both cores 211 and 212, and for purposes of performance, two separate dummy values 214, where each dummy value is set to the same value, may be used.

After configuration of configuration logic 230, default core 211 is in communication with backup core 212. Furthermore, as described below in additional detail, control word 213 is asserted in order to activate backup ICAP 222, as backup ICAP 222 is not active after configuration of FPGA 100 in favor of activation of default ICAP 221. Again, only one ICAP is able to be active at a time. Control word 213, as well as dummy values 214, may be part of a configuration bitstream, and may be stored in memory or registers of FPGA 100.

Accordingly, default core 211 and backup core 212 are instantiated in configuration logic 230, and ICAPs 221 and 222 have hardwired or dedicated circuit resources, and also include programmably configurable routing via configuration memory associated with programmable interconnects. Additionally, FAR 226 is hardwired. Furthermore, FPGA 100 may include hardwired or dedicated error detection and correction logic 210. After configuration of FPGA 100, cores 211 and 212 and ICAPs 221 and 222 may be coupled to error detection and correction logic 210. As described below in additional detail, error detection and correction logic 210 may be used to generate checksums, and to store and compare a predetermined checksum, which may be provided via a configuration bitstream 202, with an operationally determined checksum to determine if an error has occurred such as due to an SEU or MBU. Furthermore, with respect to single bit errors associated with an SEU, error detection and correction logic 210 may be used to correct such single bit errors.

Figure 3:
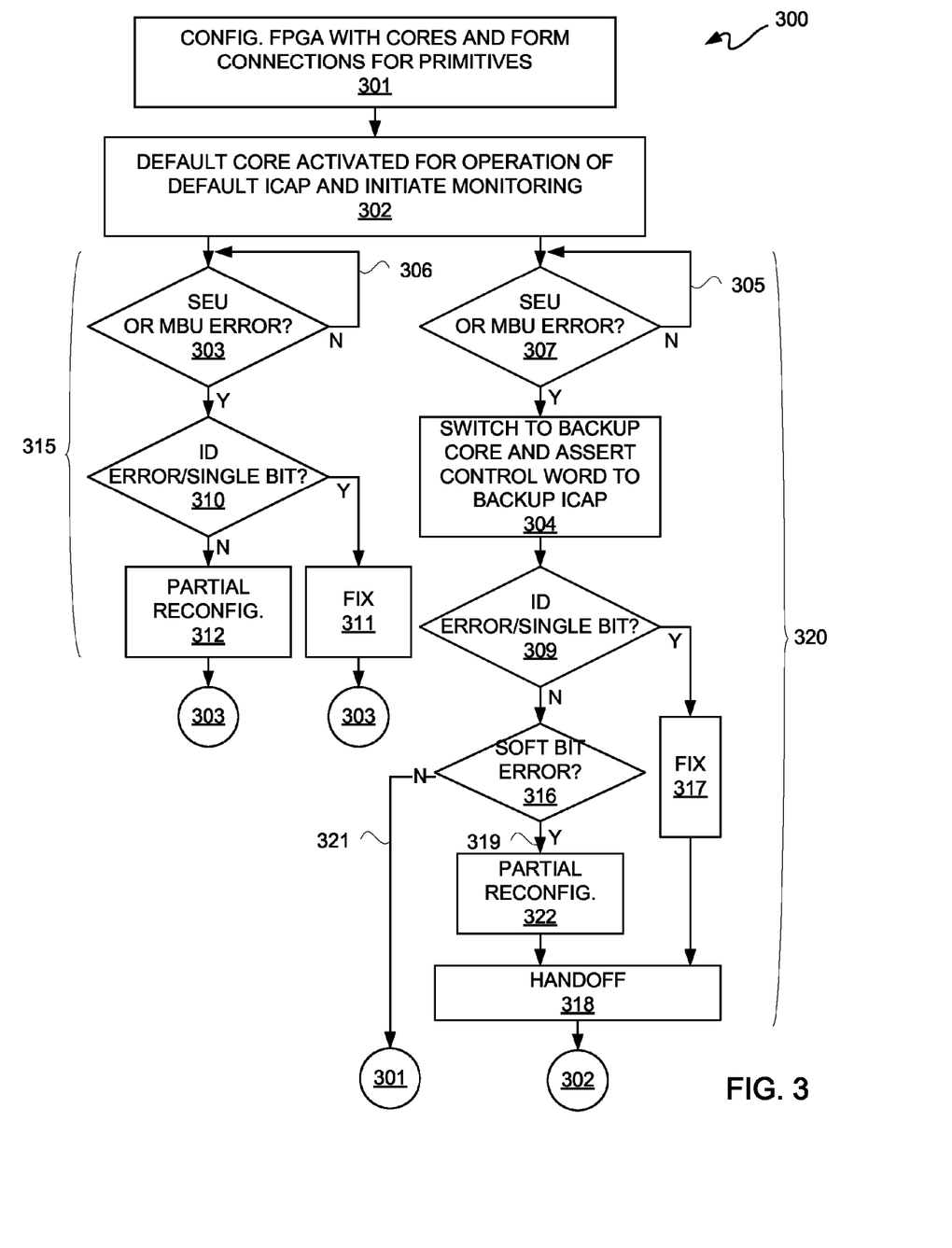
FIG. 3 is a flow diagram depicting an exemplary embodiment of a self-checking and self-correction flow.

FIG. 3 is a flow diagram depicting an exemplary embodiment of a self-checking and self-correction flow 300. With simultaneous reference to FIGS. 2 and 3, flow 300 is further described. At 301, FPGA 100 of FIG. 2 is configured with cores, such as cores 211 and 212, and connections for primitives, namely routing for ICAPs 221 and 222 programmed into programmable interconnects.

At 302, after configuration of FPGA 100 at 301, a default core, such as default core 211, is activated for operation of default ICAP 221. Furthermore, at 302, monitoring is initiated, including monitoring of default core 211 by backup core 212 as generally indicated at 307, and monitoring of configuration memory 230 associated with user design 235, backup core 212, and routing of backup ICAP 222 as generally indicated at 303.

From block 302 there are generally two branches, namely paths 315 and 320. Paths 315 and 320 each include a self-checking mode, namely monitoring at 303 and 307 as initiated at 302, and a self-correcting mode, as described below in additional detail. Path 315 is for operation of default core 211 and default ICAP 221. Path 315 may more generally be thought of as monitoring of an instantiated configuration bitstream, exclusive of default core 211 and routing of default ICAP 221, for upset events whether one or more SEUs or MBUs and self-correcting of one or more upset events detected. If at 303 no SEUs or MBUs are detected, then monitoring repeats or continues at 303, as indicated by arrow 306. If, however, one or more SEUs or MBUs is detected, then at 310 the error is identified and it is determined whether the error is fixable. An FPGA configuration bitstream may be parsed into regions or blocks, and thus errors may be localized to a bit in a frame where such frame corresponds to a location of a block of configuration logic. Alternatively, rather than checking for errors on a configuration bit frame by configuration bit frame basis, multiple frames may be grouped together. Furthermore, such multiple frames may represent blocks of configurable logic. Thus, it is possible to identify location of a bit in a frame that is in error using error detection and correction logic 210. Furthermore, it is possible to identify a frame that is in error.

If it is determined at 310 that the error is a single bit error, then such error is fixable without partial reconfiguration using error detection and correction logic 210 as indicated at 311. After such single bit error is fixed at 311, then monitoring for one or more SEUs or MBUs returns to 303 for monitoring by default core 211 via default ICAP 221. In some applications (e.g., syndrome bit applications), it may be possible to fix errors of greater than two bits, however, for purposes of clarity by way of example and not limitation, it shall be assumed that only single bit errors are fixable as described herein.

If, however, at 310 it is determined that the error involves multiple bits, such as due to an MBU, then at 312 partial reconfiguration is used to fix the frame or frames associated with such MBU. Again, partial reconfiguration at 312 does not involve having to completely reset FPGA 100; rather, only the section of circuitry associated with the bits in error may be reconfigured. Partial reconfiguration may be done on a frame-by-frame basis or a block-by-block basis, or some other grouping of configuration bits. Active partial configuration may be used, namely it may be done, without resetting FPGA, and in some instances while allowing user design 235 as previously described. After partial reconfiguration at 312, monitoring with default core 211 and default ICAP 221 resumes at 303.

Accordingly, path 315 is for monitoring or self-checking for one or more SEUs or MBUs within a grouping of configuration bits, and for self-correction of any detected upset events. Path 315 is performed by default core 211 and default ICAP 221.

Path 320 is if backup core 212 detects a problem with default core 211 or default core 211 detects a problem with ICAP 221. Thus, at 307, default monitoring of default core 211 and default ICAP 221 is performed for one or more SEUs or MBUs. If no SEU and no MBU is detected, then monitoring repeats or continues as generally indicated by arrow 305. If however, one or more SEUs or MBUs is detected at 307 as associated with either or both default core 211 and default ICAP 221, then a switch to backup core 212 is performed at 304.

At 304, backup core 212 asserts control word 213 to backup ICAP 222 such that backup ICAP 222 becomes the active or primary ICAP. Even though not shown for purposes of clarity, default core 211 and backup core 212 are both coupled via configuration logic 230 to a user instantiated design 235 for receiving signaling therefrom. Accordingly, during operation, control, data or address information may be passed from user design 235 to default core 211 and backup core 212 for operative access to an ICAP 221 and 222, respectively. Accordingly, default core 211 and backup core 212 may have generally equivalent state machines, other than a heartbeat bit state as described below in additional detail, for redundancy purposes. Therefore, even though default core 211 may not presently be operative, backup core 212 may take its place.

Figure 4:
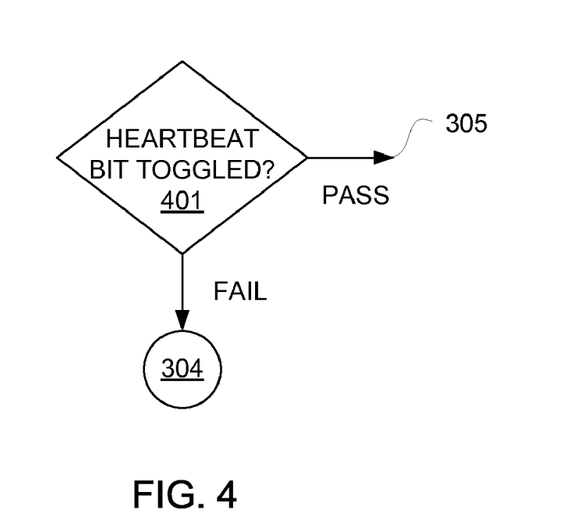
FIG. 4 is a flow diagram depicting an exemplary embodiment of monitoring of a default core of FIG. 2 by backup core also of FIG. 2 for the flow of FIG. 3.
Figure 5:
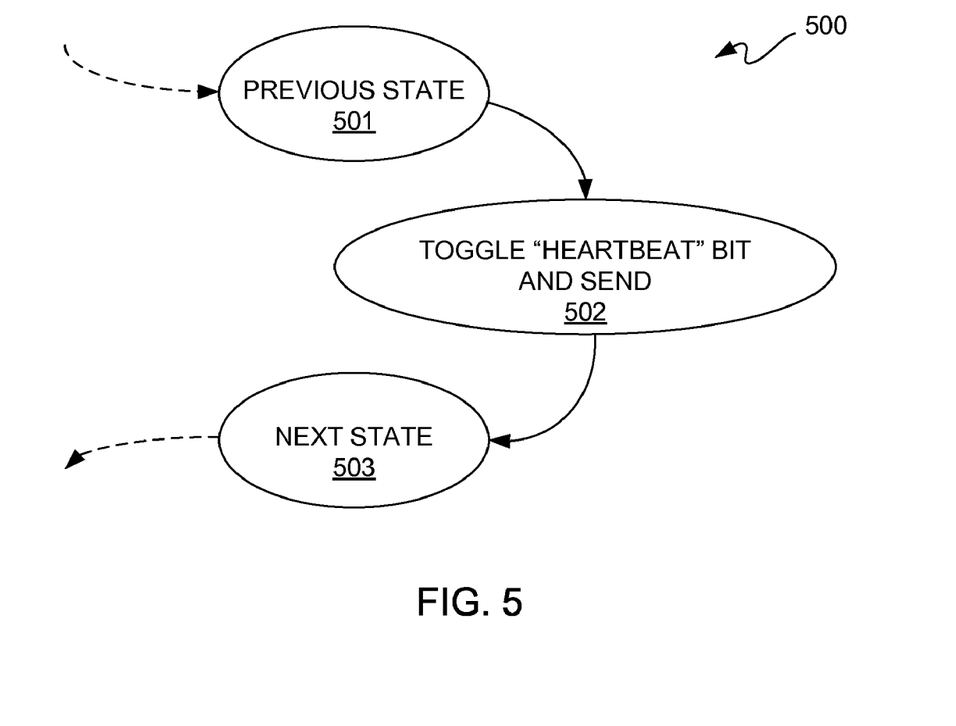
FIG. 5 is a state diagram depicting an exemplary embodiment of a portion of a state machine of a default core of FIG. 2.
Figure 6:
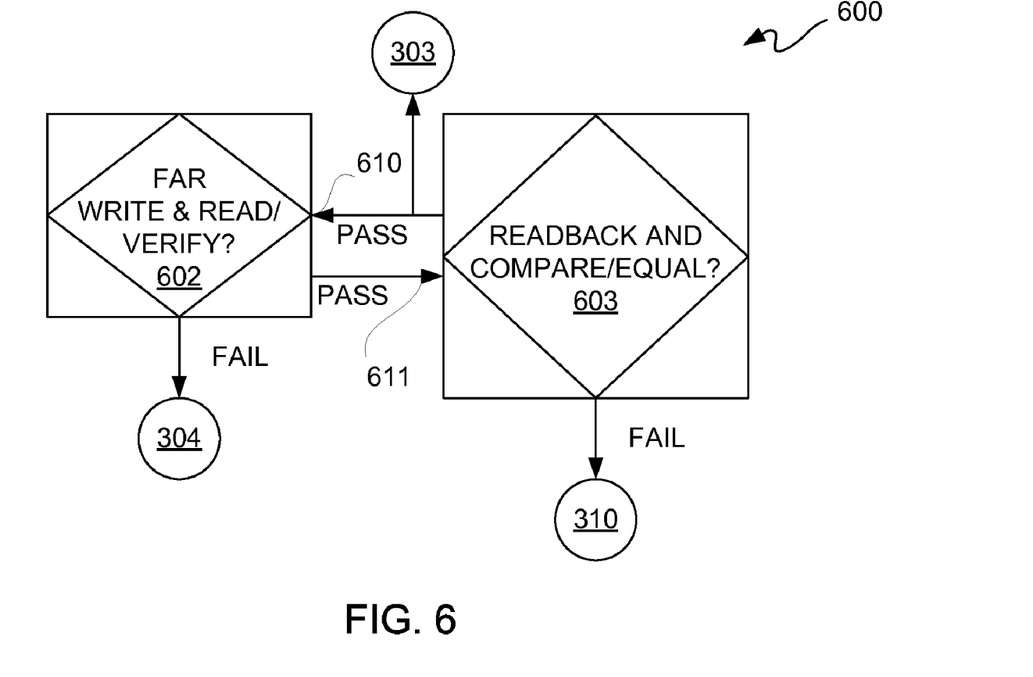
FIG. 6 is a flow diagram depicting an exemplary embodiment of an ICAP monitoring flow for the flow of FIG. 3.

In order to further appreciate operations at 303, 307, and 304, reference is made to FIGS. 4 through 6. In FIG. 4 there is shown a flow diagram depicting an exemplary embodiment of monitoring of default core 211 by backup core 212 for the flow of FIG. 3. At 401, it is determined by backup core 212 whether a "heartbeat" bit of default core 211 has toggled state. FIG. 5 is a state diagram depicting an exemplary embodiment of a portion of a state machine 500 of default core 211. As such state machine may vary from application to application, the details of such states are not provided in unnecessary detail. However, it should be appreciated that from a previous state 501 to a next state 503 there is inserted an interim state 502, namely a toggle heartbeat bit and send state 502. State 502 is to toggle such "heartbeat" bit for each operational cycle, such as for example a clock cycle, of default core 211 and send the state of such bit to backup core 212. Thus at 401 if the heartbeat bit of default core 211 toggles, backup core 212 understands that default core 211 is operational. This is indicated as a pass in FIG. 4, and monitoring may repeat or continue at 307 as generally indicated by arrow 305. If, however, at 401 it is determined by backup core 212 that the heartbeat bit has not toggled state from one operational cycle to a next operational cycle, namely from a previous state 501 to a next state 503 of default core 211, then backup core 212 understands that default core 211 is no longer operational as generally indicated by a fail in FIG. 4 and flow 300 proceeds to 304. This may be generally thought of as detecting one or more SEUs or MBUs affecting performance of default core 211 or default ICAP 221. With respect to the latter, if default ICAP 221 is not operational as determined by default core 211, as described below in additional detail, default core 211, which may be operational other than use of default ICAP 221, does not toggle the heartbeat bit to signal to backup core 212 to take over.

FIG. 6 is a flow diagram depicting an exemplary embodiment of an ICAP monitoring flow 600 for the flow of FIG. 3. At 602, a dummy value 214 is written to FAR 226 of default ICAP 221. Furthermore, at 602 such written dummy value is then read from FAR 226. The writing and reading of dummy value 214 to and from FAR 226 is performed using default ICAP 221.

At 602, it is determined whether the value read from FAR 226 by default ICAP 221 matches a stored dummy value 214 written thereto. If at 602 it is determined that the read dummy value is not equivalent to the stored dummy value, then it is determined by default core 211 that default ICAP 221 is not operating properly. Accordingly, a switch to backup core 212 is initiated by default core 211. Such switch or transfer may be initiated by default core 211 by not toggling its heartbeat bit, namely a fail is indicated for proceeding to operations at 304 as generally indicated in FIG. 4.

Even though the above description was in terms of default core 211 and default ICAP 221, backup core 212 may perform the same operations using backup ICAP 222 and FAR 226 to monitor the health of backup ICAP 222 for an SEU or MBU for when backup module 197 becomes the primary ICAP circuitry. Accordingly, description is not repeated for purposes of clarity.

If, however, at 602 it is determined that the read dummy value and the stored dummy value 214 are equivalent, then default ICAP 221 passes over for operations at 603 as generally indicated by arrow 611. For an operative default ICAP module 198, path 315 is used in contrast to if a fail was detected at 401 or 602, then path 320 is used. Accordingly, it should be appreciated that operations at 602 may be part of default monitoring at 307. Furthermore, it should be appreciated that operation at 401 is part of default monitoring at 307.

If at 602 it is determined that default ICAP 221 is operative, then at 603 a readback of a configuration bitstream, exclusive of a readback of configuration bits for default core 211 and default ICAP 221, is performed. The readback may include a readback of backup core 212 and backup ICAP 222 configuration bits. Thus, operations at 603 may be part of the monitoring at 303. During such readback, checksum values may be computed by error detection and correction logic 210. Again, for a functioning ICAP 221 as previously determined at 602, such default ICAP 221 is used to read back configuration bits from configuration memory 231 under control of default core 211. If it is determined that the operatively determined checksum value is equivalent to a predetermined checksum, as may be stored in for example memory 220 or in registers of error detection and correction logic 210, then such configuration bits are valid as indicated by a pass designation of arrow 610, and monitoring at 303 repeats or continues as does monitoring of default ICAP 221 at 602. If, however, the checksums are not equal, then a fail is determined at 603, and as 603 is part of 303 as previously described the error is identified and it is determined at 310 whether the error is fixable as a single bit error or fixable by partial reconfiguration as a multi-bit error.

Returning to FIG. 3, if it is determined that default core 211 has seized, namely a heartbeat bit is not toggling as determined at 401, or if it is determined that default ICAP 221 is not operative at 602, namely generally monitoring at 307 of default ICAP 221 by default core 211, then a switch to backup core 212 is performed at 304.

As previously described, backup core 212 asserts control word 213 to activate backup ICAP 222 taking control as the primary ICAP over default ICAP 221. Without the assertion of control word 213, default ICAP 221 by factory setting of FPGA 100 precludes use of backup ICAP 222. Thus control word 213 overrides such factory setting.

Continuing along path 320, at 309, the error is identified, as previously described with reference to operations at 310, though here it is for configuration bits of default module 198. At 309, it is determined whether default core 211 or ICAP 221, or both, is fixable. For single bit errors, a fix may be performed at 317, which is the same as the fixing of single bit errors as previously described with reference to operations at 311. If the error identified at 309 is a multi-bit error, then it may be determined at 316 whether partial reconfiguration or complete reconfiguration is to be performed. Generally, bit errors whether single bit errors or multiple bit errors caused by an SEU or MBU affecting single state of configuration memory cells are known as soft bit errors. Such soft bit errors are fixable by partial reconfiguration. Thus at 316 if it is determined that the errors are soft bit errors, partial reconfiguration is performed at 322 to fix such soft bit errors. Accordingly, it has been assumed that only soft bit errors are detected.

However, it is possible that an ICAP, such as ICAP 221 or 222, is failing a FAR write, read, and compare test due to a hard bit error or errors. If an error is a hard bit error it may not be possible to fix the error either as a single bit error or a multiple bit error by error correction of a single bit or partial reconfiguration, respectively, because the state of any state machine associated with such error or errors may be unknown. Accordingly, in the instance of hard bit error a complete reconfiguration of FPGA 100 may be initiated at 316 as generally indicated by arrow 321. Such a complete reconfiguration initiated at 316 may be a repeat of the operations performed at 301.

If at 316 it is determined that partial reconfiguration may be performed to fix an error condition such as caused by an MBU, then at 322 partial reconfiguration is performed and as generally indicated by arrow 319. After such partial reconfiguration to fix either or both default core 211 and default ICAP 221, a handoff is initiated at 318. Furthermore, after a fix at 317 to fix either or both default core 211 and default ICAP 221, a handoff is initiated at 318. Such handoff at 318 is to return default core 211 and default ICAP 221 as the primary internal configuration circuit, namely control word 213 is deasserted returning FPGA 100 back to its factory setting. After a handoff 318, at 302 default core 211 is activated for operation of default ICAP 221 and monitoring resumes at 303 and 307. In another embodiment, a soft bit error decision 316 is inserted in path 315 between blocks 310 and 312 for branching to 301 for a hard bit error condition.

Accordingly, if a single bit error or multiple bit error is determined for a default internal configuration circuit, then a backup internal configuration circuit is used for fixing the default configuration circuit. This fixing mode or self-correcting mode allows only two ICAPs to be used without having a single point of failure. Furthermore, it should be appreciated that the backup internal configuration circuit, namely backup core 212 and backup ICAP 222 may be monitored for SEU/MBU activity along with the rest of a user instantiated design. Thus, no additional overhead is needed for this redundancy with respect to such monitoring. Furthermore, validation of an internal configuration port may be performed by writing a dummy value to and reading a dummy value from a frame address register and then comparing the dummy value written to the dummy value stored to ascertain whether the internal configuration port is operating properly, and if not operating properly, control may be turned over to the backup internal configuration port. Additionally, generally there are two sets of configuration bits monitored for the purposes of the two redundant internal configuration port circuits. The first set of configuration bits checked for one or more event upsets is associated with all circuitry other than the internal configuration port circuitry configuration bits performing such check, such as for example configuration bits of configuration memory associated with default core 211 and default ICAP 221. The other set of configuration bits is the previously mentioned excluded set, namely the configuration bits associated with configuration memory of default core 211 and default ICAP 221, which are separately monitored for one or more event upsets. However within this separate monitoring, the default core 211 operationally monitors default ICAP 221 by writing to and reading from a register and comparing the read value with a stored expected value.

While the foregoing describes exemplary embodiment(s) in accordance with one or more aspects of the invention, other and further embodiment(s) in accordance with the one or more aspects of the invention may be devised without departing from the scope thereof, which is determined by the claim (s) that follow and equivalents thereof. Claim(s) listing steps do not imply any order of the steps. Trademarks are the property of their respective owners.

What is claimed is:

1. A method for self-correcting, comprising:
    configuring a programmable resource of an integrated circuit, the act of configuring comprising:
       instantiating a first core and a second core; and
       forming interconnects including connections for a first internal configuration port and a second internal configuration port of the integrated circuit;
    activating the first core for operation of the first internal configuration port as a default internal configuration port;
    monitoring operation of the first core by the second core;
    responsive to a failure of the first core or the first internal configuration port, transferring control over to the second core for operation of the second internal configuration port in a self-correcting mode;
    determining whether the failure is a single bit soft error failure or a multiple bit soft error failure; and
    if the failure is the single bit soft error failure or the multiple bit soft error failure, fixing the failure by fixing a memory associated with the failure using the second internal configuration port.

2. The method according to claim 1, wherein:
    determining whether the failure is a single bit soft error failure;
    fixing the single bit soft error failure by using the second internal configuration port to set a configuration bit of a configuration memory cell associated with the single bit error failure; and
    switching control back to the first core for operation of the first internal configuration port as the default internal configuration port.

3. The method according to claim 2, wherein the act of switching control includes asserting a control word for the second internal configuration port for activation thereof.

4. The method according to claim 1, wherein:
    determining whether the failure is a multiple bit soft error failure;
    fixing the multiple bit soft error failure using the second internal configuration port for partial reconfiguration of configuration memory associated with the multiple bit error failure; and
    switching control back to the first core for operation of the first internal configuration port as the default internal configuration port.

5. The method according to claim 1, further comprising:
    determining whether the failure is a hard bit error failure;
    fixing the hard bit error failure by repeating the configuring; and
    repeating the activating and the monitoring.

6. The method according to claim 1, wherein responsive to a failure of the second core or the second internal configuration port, the method further comprises:
    determining whether the failure of the second core of the second internal configuration port is a single bit soft error failure; and
    fixing the single bit soft error failure using the first internal configuration port to set a configuration bit of a configuration memory cell associated with the single bit error failure.

7. The method according to claim 1, wherein responsive to a failure of the second core or the second internal configuration port, the method further comprises:
    determining whether the failure of the second core of the second internal configuration port is a multiple bit soft error failure; and
    fixing the multiple bit soft error failure using the first internal configuration port for partial reconfiguration of configuration memory associated with the multiple bit error failure.

8. The method according to claim 1, wherein the act of monitoring includes:
    checking by the second core for periodic toggling of a state bit indicating operation of the first core.

9. The method according to claim 1, further comprising:
    validating operation of the first internal configuration port by the first core;
    the validating including:
       writing, with the first internal configuration port, a dummy value to a frame address register;
       reading, with the first internal configuration port, the dummy value written from the frame address register; and
       verifying whether the dummy value written and the dummy value read are equivalent.

10. The method according to claim 9, further comprising:
    responsive to the failure being of the first internal configuration port as determined by the verifying indicating that the dummy value written and the dummy value read are not equivalent, turning over control from the first core to the second core for the switching.

11. The method according to claim 9, further comprising:
    responsive to the verifying, indicating that the dummy value written and the dummy value read are equivalent;
    reading back, via the first internal configuration port of a configuration memory, to obtain a first checksum value; and
    comparing the first checksum value with a second checksum value, wherein the second checksum value is a predetermined expected result for the obtaining of the first checksum value.

12. The method according to claim 11, further comprising:
    responsive to the first checksum value and the second checksum value not being equivalent, indicating an error condition;
    determining whether the error condition is for a single bit soft error condition; and
    fixing the single bit soft error condition using the first internal configuration port to set a configuration bit of a configuration memory cell associated with the single bit error condition.

13. The method according to claim 11, further comprising:
    responsive to the first checksum value and the second checksum value not being equivalent, indicating an error condition;
    determining whether the error condition is for a multiple bit soft error condition; and
    fixing the multiple bit soft error condition using the first internal configuration port for partial reconfiguration of configuration memory associated with the multiple bit error condition.

14. An apparatus for self-correcting, comprising:
    a programmable resource of an integrated circuit;

a first core and a second core instantiated in the programmable resource;
a first internal configuration port and a second internal configuration port of the integrated circuit respectively connected to the first core and the second core, wherein the second core is coupled to the first core for monitoring operation of the first core with the second core; and the second core is configured to obtain control responsive to a failure of the first core or the first internal configuration port for a self-correcting mode, and wherein the second core determines whether the failure is a single bit soft error failure or a multiple bit soft error failure, and if the failure is the single bit soft error failure or the multiple bit soft error failure, then fixes the failure by fixing a memory associated with the failure using the second internal configuration port.

15. The apparatus according to claim 14, wherein:
the second core is configured to initiate fixing the single bit soft error failure using the second internal configuration port to set a configuration bit of a configuration memory cell associated with the single bit error failure; and
the second core is configured to initiate fixing the multiple bit soft error failure using the second internal configuration port for partial reconfiguration of configuration memory associated with the multiple bit error failure, wherein control is switched back to the first core for operation of the first internal configuration port as the default internal configuration port.

16. The apparatus according to claim 15, wherein the second core is configured to assert a control word for the second internal configuration port for activation thereof.

17. The apparatus according to claim 15, wherein:
the first core is configured to periodically toggle a state bit to indicate an operative state of the first core; and
the second core is configured to monitor toggling of the state bit to determine if operation of the first core seizes.

18. The apparatus according to claim 15, wherein:
the first core is configured to cause a write by the first internal configuration port of a stored dummy value to a frame address register of the first internal configuration port, to cause a read by the first internal configuration port of the frame address register, and to compare the dummy value written and the dummy value read for equivalence.

19. The apparatus according to claim 14, wherein:
the first core is configured to cause a readback via the first internal configuration port of a configuration memory and configured for obtaining a first checksum value from the readback;
the first core is configured to compare the first checksum value with a second checksum value for equivalence;
the second checksum value is a predetermined expected result for the obtaining of the first checksum value;
the first core is configured to initiate a repair responsive to the first checksum value and the second checksum value not being equivalent;
the first core is configured to determine whether an error condition is for a single bit soft error condition or a multiple bit soft error condition; and
the first core is configured to initiate fixing the single bit soft error condition using the first internal configuration port to set a configuration bit of a configuration memory cell of the configuration memory associated with the single bit soft error condition; and
the first core is configured to initiate fixing the multiple bit soft error condition using the first internal configuration port for partial reconfiguration of a portion of the configuration memory associated with the multiple bit soft error condition.

20. An apparatus for self-correcting, comprising:
a programmable resource having instantiated thereof a first core and a second core and having a first internal configuration port and a second internal configuration port;
the first core configured to operate the first internal configuration port as a default internal configuration port;
the first core configured to monitor operation of the first internal configuration port;
the first core configured to perform a readback via the first internal configuration port of a configuration memory associated with the programmable resource to check for one or more first event upsets;
the second core configured to monitor operation of the second internal configuration port and to monitor operation of the first core;
responsive to a failure of the first core or the first internal configuration port due to one or more second event upsets, the second core configured to take over from the first core for repairing the first core or the first internal configuration port; and
the second core configured to initiate partial reconfiguration via the second internal configuration port for repair of a multiple bit soft error of the first core or the first internal configuration port.

* * * * *